US010023994B2

(12) United States Patent
Barth et al.

(10) Patent No.: US 10,023,994 B2
(45) Date of Patent: Jul. 17, 2018

(54) COATED FABRIC PRODUCTS

(75) Inventors: Marita Barth, Ingelheim (DE);
William Blackwood, Midland, MI (US); Vittorio Clerici, Oestrich-winkel (DE); Andrew William Mountney, Warwick (GB)

(73) Assignee: DOW SILICONES CORPORATION, Midland, MI (US)

( * ) Notice: Subject to any disclaimer, the term of this patent is extended or adjusted under 35 U.S.C. 154(b) by 196 days.

(21) Appl. No.: 13/509,400

(22) PCT Filed: Nov. 12, 2010

(86) PCT No.: PCT/US2010/056489
§ 371 (c)(1),
(2), (4) Date: May 11, 2012

(87) PCT Pub. No.: WO2011/060238
PCT Pub. Date: May 19, 2011

(65) Prior Publication Data
US 2012/0225228 A1  Sep. 6, 2012

Related U.S. Application Data

(60) Provisional application No. 61/260,518, filed on Nov. 12, 2009.

(51) Int. Cl.
*D06N 3/14* (2006.01)
*B05D 5/08* (2006.01)
*B05D 7/00* (2006.01)
*B60R 21/235* (2006.01)
*C10M 169/04* (2006.01)
*C10M 173/02* (2006.01)
*D06N 3/00* (2006.01)
*D06N 3/04* (2006.01)
*D06N 3/18* (2006.01)

(52) U.S. Cl.
CPC .............. *D06N 3/144* (2013.01); *B05D 5/08* (2013.01); *B05D 5/083* (2013.01); *B05D 5/086* (2013.01); *B05D 7/52* (2013.01); *B60R 21/235* (2013.01); *C10M 169/04* (2013.01); *C10M 173/02* (2013.01); *D06N 3/0056* (2013.01); *D06N 3/0063* (2013.01); *D06N 3/047* (2013.01); *D06N 3/183* (2013.01); *B60R 2021/23514* (2013.01); *C10M 2201/02* (2013.01); *C10M 2201/102* (2013.01); *C10M 2209/109* (2013.01); *C10M 2213/062* (2013.01); *C10M 2227/04* (2013.01); *C10M 2229/0405* (2013.01); *C10M 2229/0465* (2013.01); *C10N 2220/082* (2013.01); *C10N 2230/06* (2013.01); *C10N 2250/121* (2013.01); *Y10T 428/1334* (2015.01)

(58) Field of Classification Search
None
See application file for complete search history.

(56) References Cited

U.S. PATENT DOCUMENTS

| | | | |
|---|---|---|---|
| 3,455,877 A | | 7/1969 | Plueddemann |
| 4,284,682 A | * | 8/1981 | Frosch et al. ................ 442/139 |
| 4,787,991 A | * | 11/1988 | Morozumi et al. ........... 508/112 |
| 5,110,666 A | | 5/1992 | Menzel et al. |
| 5,258,211 A | * | 11/1993 | Momii et al. ................ 428/35.2 |
| 5,427,698 A | * | 6/1995 | Hirokawa et al. ............ 508/106 |
| 5,789,084 A | | 8/1998 | Nakamura et al. |
| 5,877,256 A | | 3/1999 | Nakamura et al. |
| 5,945,185 A | | 8/1999 | Hirai et al. |
| 6,169,043 B1 | | 1/2001 | Li |
| 6,177,365 B1 | | 1/2001 | Li |
| 6,177,366 B1 | | 1/2001 | Li |
| 6,239,046 B1 | | 5/2001 | Veiga et al. |
| 6,245,695 B1 | * | 6/2001 | Maruo et al. ................ 442/136 |
| 6,350,709 B1 | * | 2/2002 | Veiga ............................ 442/71 |
| 6,355,343 B1 | | 3/2002 | Glassock |
| 6,425,600 B1 | | 7/2002 | Fujiki et al. |
| 6,458,724 B1 | * | 10/2002 | Veiga et al. .................. 442/76 |
| 6,511,754 B1 | | 1/2003 | Bohin et al. |
| 6,534,126 B1 | | 3/2003 | Blackwood et al. |
| 6,709,752 B1 | | 3/2004 | James et al. |
| 7,198,854 B2 | | 4/2007 | Dumont et al. |
| 7,309,528 B2 | | 12/2007 | Clerici et al. |
| 7,524,797 B1 | | 4/2009 | Perez, Jr. et al. |
| 7,543,843 B2 | | 6/2009 | Keshavaraj et al. |
| 7,737,059 B1 | | 6/2010 | Keshavaraj |
| 7,947,865 B2 | | 5/2011 | Fossum et al. |
| 2002/0017779 A1 | | 2/2002 | Gilpatrick et al. |

(Continued)

FOREIGN PATENT DOCUMENTS

| | | |
|---|---|---|
| CN | 101122093 A | 2/2008 |
| CN | 101443512 A | 5/2009 |

(Continued)

OTHER PUBLICATIONS

English language abstract and translation for EP 1595938 extracted from the espacenet.com database on Aug. 15, 2012, 10 pages.
English language abstract for WO 2007/071631 extracted from the espacenet.com database on Aug. 15, 2012, 38 pages.
English language abstract for WO 2008/020605 extracted from the espacenet.com database on Aug. 15, 2012, 26 pages.
English language abstract for WO 2008/020635 extracted from the espacenet.com database on Aug. 15, 2012, 28 pages.
International Search Report for Application No. PCT/US2010/056503 dated Apr. 20, 2011, 5 pages.
International Search Report for Application No. PCT/US2010/056489 dated Apr. 20, 2011, 5 pages.
English language abstract and machine-assisted English translation for CN 101122093 extracted from the espacenet.com database on Oct. 28, 2013, 35 pages.

(Continued)

*Primary Examiner* — Chinessa T. Golden
(74) *Attorney, Agent, or Firm* — Howard & Howard Attorneys PLLC

(57) ABSTRACT

An air bag coated with a cured organopolysiloxane composition, characterized in that the air bag is top coated with an antifriction coating comprising at least one solid lubricant dispersed in an organic polymer binder.

10 Claims, No Drawings

(56) References Cited

U.S. PATENT DOCUMENTS

| | | |
|---|---|---|
| 2003/0027474 A1 | 2/2003 | Hayes |
| 2003/0194934 A1* | 10/2003 | Newbill ................. 442/208 |
| 2003/0198767 A1* | 10/2003 | Breed et al. ............. 428/36.1 |
| 2005/0059765 A1* | 3/2005 | Finch et al. ............. 524/430 |
| 2005/0218640 A1* | 10/2005 | Kokeguchi ............. 280/743.1 |
| 2006/0014456 A1 | 1/2006 | Li |
| 2006/0276585 A1 | 12/2006 | Lork |
| 2007/0015425 A1 | 1/2007 | Hill et al. |
| 2008/0051547 A1* | 2/2008 | Wakabayashi et al. ........ 528/18 |
| 2009/0186543 A1 | 7/2009 | Keshavaraj et al. |
| 2009/0298367 A1 | 12/2009 | Lafaysse et al. |
| 2010/0190395 A1 | 7/2010 | Nozoe et al. |
| 2010/0190396 A1 | 7/2010 | Nozoe et al. |
| 2010/0297903 A1* | 11/2010 | Thiria et al. ............... 442/65 |
| 2012/0225228 A1 | 9/2012 | Barth et al. |
| 2012/0288649 A1 | 11/2012 | Blackwood et al. |
| 2015/0267344 A1 | 9/2015 | Blackwood et al. |

FOREIGN PATENT DOCUMENTS

| | | |
|---|---|---|
| EP | 0617118 A1 | 9/1994 |
| EP | 0712956 A1 | 5/1996 |
| EP | 0953675 A2 | 11/1999 |
| EP | 1205595 A2 | 5/2002 |
| EP | 1 595 935 A2 | 11/2005 |
| EP | 1595938 A1 | 11/2005 |
| EP | 1887060 A1 | 2/2008 |
| JP | 2002-520183 A | 7/2002 |
| JP | 2004-534684 A | 11/2004 |
| JP | 2007-501081 A | 1/2007 |
| JP | 2009-190171 A | 8/2009 |
| WO | WO 2004070102 A2 * | 8/2004 |
| WO | WO 2007/071631 A1 | 6/2007 |
| WO | WO 2008/020605 A1 | 2/2008 |
| WO | WO 2008/020635 A1 | 2/2008 |
| WO | WO 2011/060245 A1 | 5/2011 |

OTHER PUBLICATIONS

English language abstract and machine-assisted English translation for CN 101443512 extracted from the espacenet.com database on Oct. 28, 2013, 40 pages.

Wacker, "Silicone Resins", www.wacker.com/cms/en/products_groups/silicone_resins.jsp, 2016, 3 pages.

Wikipedia, "Silicone Oil", www.en.wikipedia.org/wiki/silicone_oil, 2016, 2 pages.

English language abstract for JP 2002-520183 extracted from espacenet.com database on Sep. 23, 2015, 1 page.

English language abstract for JP 2004-534684 extracted from espacenet.com database on Sep. 23, 2015, 2 pages.

English language abstract for JP 2007-501081 extracted from espacenet.com database on Sep. 23, 2015, 1 page.

English language abstract and machine-assisted English translation for JP 2009-190171 extracted from espacenet.com database on Sep. 23, 2015, 17 pages.

* cited by examiner

COATED FABRIC PRODUCTS

RELATED APPLICATIONS

This application claims priority to and all the advantages of International Patent Application No. PCT/US2010/056489, filed on Nov. 12, 2010, which claims priority to U.S. Provisional Patent Application No. 61/260,518, filed on Nov. 12, 2009.

This invention relates to the coating of air bags, which are used for safety purposes to protect occupants of vehicles such as automobiles, and of air bag fabrics intended to be made into air bags. In particular the invention relates to the top coating with a friction reducing composition of air bags and air bag fabrics which have been coated with a cured organopolysiloxane composition. The invention also relates to coating compositions for overcoating air bags and air bag fabrics which have been coated with a cured organopolysiloxane composition.

Air bags are generally formed from a woven or knitted fabric made of synthetic fibre, for example of polyamide such as nylon-6,6 or polyester, covered on at least one of its sides with a layer of an elastomer. Air bags may be made of flat fabric pieces which are coated and then sewn together to provide sufficient mechanical strength, or may be woven in one piece with integrally woven seams. Sewn air bags are generally assembled with the coated fabric surface at the inside of the air bag. One piece woven air bags are coated on the outside of the air bag. A preferred elastomer for coating the air bag or air bag fabric is a silicone elastomer which is a cured organopolysiloxane composition, particularly a silicone rubber coating cured by hydrosilylation, that is by the reaction of alkenyl groups of one polyorganosiloxane and Si—H groups of another polyorganosiloxane Air bags coated with a silicone elastomer are described in many published patents and applications, for example U.S. Pat. Nos. 5,789,084, 5,877,256, 6,709,752, 6,425,600 and 6,511,754, and WO-A-08/020605 and WO-A-08/020635.

For some airbag applications, pressurised gas has to be retained in a fabric envelope for a relatively long period. This requirement exists for example in side curtain airbags for the automotive industry. These side curtain airbags are intended to inflate at the time of impact, as do conventional airbags. The side curtains unfold to form a cushioned curtain between passengers and some of the side of the car body, e.g., the windows. As the intention is not merely to cushion the blow on impact itself, as is the case for conventional driver and passenger airbags, but to protect passengers e.g. when a car is rolling, it is important that the side curtain air bag is sufficiently pressurised during such rolling process. Where conventional driver and passenger airbags only need to retain pressure for a fraction of a second, it is desirable that side curtain airbags maintain a suitable pressure for a few seconds. Similar applications exist where a pressurised fabric structure is desired to maintain a certain gas pressure for a relatively extended period of time, e.g. in emergency chutes for aeroplanes, or inflatable rafts. There is thus a demand for coated fabrics having the benefits of flexibility and high temperature resistance at low coating weight given by silicone rubber coatings, but with improved air tightness.

Silicone elastomer coatings on air bags have an excellent combination of flexibility and low enough gas permeability of the coated fabric. However, silicone elastomer coatings have a high surface friction when cured. If a silicone elastomer base coat is left as the only coating on the air bag, the surface properties of this base coat would result in blocking (the silicone surfaces sticking to each other during storage and tight packing of the air bag in the automobile) and very high stresses when the airbag is inflated which would result in bag failure by tearing during inflation.

U.S. Pat. No. 6,177,366 describes airbag coating compositions comprising at least two separate and distinct layers. The first layer (base coat), being in contact with the airbag surface, comprises a silicone elastomer. The second layer (topcoat) is preferably a silicone resin.

U.S. Pat. No. 7,198,854 describes an anti-friction silicone varnish for textiles coated with silicone elastomers. The varnish comprises a crosslinkable silicone composition containing two silicones which react with one another in the presence of a catalyst to allow crosslinking, and a particulate component comprising powdered (co)polyamides.

We have found that crosslinked silicone compositions do not have a sufficiently low coefficient of friction to avoid blocking of the air bag surfaces during storage and tearing of the air bag during inflation unless highly filled with a low friction filler such as talc. Air bag manufacturers do not like such highly filled compositions as the talc settles during storage and the composition is difficult to apply consistently at low coat weights.

According to one aspect of the present invention, an air bag coated with a cured organopolysiloxane composition is top coated with an antifriction coating comprising at least one solid lubricant dispersed in an organic polymer binder. By an organic polymer we mean a polymer in which at least 50% of the atoms forming the polymer chain are carbon atoms.

According to another aspect of the invention, a process for coating an air bag or air bag fabric in which the bag or fabric is coated with an organopolysiloxane composition is characterized in that the air bag is top coated with an antifriction coating composition comprising an aqueous dispersion of at least one dispersed solid lubricant.

The invention also includes an antifriction coating composition comprising an aqueous dispersion of a solid fluoropolymer in a dispersion of an organic polymer binder, characterized in that the aqueous dispersion contains a siloxane polyether wetting agent.

The solid lubricant present in the antifriction coating can for example comprise a fluoropolymer such as polytetrafluoroethylene (PTFE), a solid hydrocarbon wax such as a polyolefin wax, for example micronised polypropylene wax, or a mixture of PTFE and wax. The solid lubricant can additionally or alternatively comprise a lubricant mineral such as talc, which may be in the form of talc microspheres, montmorillonite, molybdenum disulphide, graphite, zinc sulfide or tricalcium phosphate, or a mixture of any two or more of these. Mineral lubricants such as talc are also effective in reducing friction at the air bag surfaces, and can be used to partly or totally replace the PTFE as solid lubricant.

We have found that a combination of fluoropolymer and talc is particularly effective at reducing friction at the air bag surfaces. Surprisingly, the addition of talc to an antifriction coating composition containing PTFE as solid lubricant can substantially reduce the coefficient of friction of the coated fabric, for example to half or less the coefficient of friction that can be achieved by PTFE alone, and much less than can be achieved by talc alone as solid lubricant.

The solid lubricant antifriction coating is preferably applied to the air bag or air bag fabric in both cases previously coated with a organopolysiloxane composition from an aqueous dispersion. The coating composition generally requires a binder to enhance the adhesion of the solid lubricant to the air bag fabric. The binder can for example be an organic polymer binder. Preferred organic polymer binders include polyurethanes, phenolic resins, epoxy resins, acrylic resins, polyester resins, amino-formaldehyde resins, vinyl resins, for example polyvinyl butyral, and polyamideimide resins. Preferred polyurethanes include copolymers of a polyester polyol and an aromatic or aliphatic diisocyanate. Preferred phenolic resins include copolymers of phenol and formaldehyde and copolymers of phenol, formaldehyde and cresol. A preferred epoxy resin is copolymer of bisphenol A and epichlorohydrin. The coating present on the air bag fabric surface thus comprises a solid lubricant dispersed in an organic polymer binder. The level of organic polymer binder can for example be in the range 2 or 3% up to 50% by weight of the antifriction coating composition on a dry coat weight basis, i.e. 2 to 50% or alternatively 3 to 50% by weight of the antifriction coating composition on a dry coat weight basis. Levels of organic polymer binder of for example 5 or 10% up to 35% i.e. 5 to 35% or alternatively 10 to 35% by weight of the coating composition on a dry coat weight basis are often preferred.

For the sake of clarification, It is to be understood that where % values are provided the total amount of e.g. the composition always adds up to 100%. Furthermore, reference to ranges in the composition on a dry coat weight basis is intended to mean the weight calculated to exclude the weight of the water and or co-solvent.

In one preferred aspect of the invention the antifriction coating composition applied to the air bag fabric, previously coated organopolysiloxane composition, comprises an aqueous dispersion of a solid lubricant, such as a fluoropolymer and/or talc, in a dispersion of an organic polymer binder or an organic polymer binder/aminosilane mixture. The dispersion of organic polymer binder or organic polymer binder/aminosilane mixture can be an aqueous solution, optionally containing a water-miscible organic co-solvent if required, or can be an aqueous emulsion or suspension. Such an emulsion or suspension is generally stabilized by at least one surfactant, which can be selected from non-ionic, anionic, cationic and amphoteric surfactants and mixtures of two or more of these. An example of a suitable non-ionic surfactant is an alkyl ethoxylate (ethoxylated fatty alcohol) or an aralkyl ethoxylate such as (t-Octylphenoxy)polyethoxyethanol. An example of a suitable anionic surfactant is sodium dodecylbenzenesulfonate. Any suitable co-solvent may be utilized and the selection will be dependent on the organic polymer binder in the composition but potential co-solvents include, for the sake of example, alcohols and n-alkylpyrollidones.

The amino silanes such as, for example (ethylenediaminepropyl) trimethoxysilane N-(2-aminoethyl)-3-aminopropyltrimethoxysilane aminoalkylalkoxysilanes, N-phenylaminomethyldimethoxymethylsilane, N-cyclohexylaminomethyldimethoxymethylsilane, N-methylaminomethyl-dimethoxymethylsilane, N-ethylaminomethyldimethoxy-methylsilane, N-propylaminomethyldimethoxymethylsilane, N-butylaminomethyldimethoxymethylsilane, (methacryloyl-oxymethyl)-dimethoxymethylsilane, N-(dimethoxymethyl-silylmethyl)-O-methylcarbamate, the products from the Michael like addition reaction of aminomethyldimethoxymethylsilane with Michael acceptors such as maleic diesters, fumaric diesters, citraconic diesters, acrylic esters, methacrylic esters, cinnamic esters, itaconic diesters, vinylphosphonic diesters, vinylsulfonic aryl esters, vinyl sulfones, vinyl nitriles, 1-nitroethylenes or Knoevenagel condensation products such as those, for example, of malonic diesters and aldehydes such as formaldehyde, acetaldehyde or benzaldehyde may be used in combination with the aforementioned binder system. When present, the ratio between the organic polymer binder and the amino silane is from 1:5 to 9:1 ratios on a dry weight basis. Typically when intended to form an integral part of the binder system said aminosilanes are present in an amount of from about 10 to 25% weight based on the dry coat weight. When the aminosilane is present; the organic polymer binder and amino silane mixture can for example comprise 3 to 70% of the coating on a dry weight basis.

The antifriction coating can be prepared by dispersing the solid lubricant in a dispersion of an organic polymer binder, or by mixing a dispersion of solid lubricant with a dispersion of an organic polymer binder, or by dispersing an organic polymer binder in a dispersion of solid lubricant. Combinations of these techniques can be used; for example a dispersion of a fluoropolymer solid lubricant can be mixed with a dispersion of an organic polymer binder and a mineral solid lubricant such as talc can be mixed into the resulting dispersion.

The antifriction coating composition preferably comprises from 10%, up to 90%, more preferably up to 80% by weight of the solid lubricant on a dry weight basis e.g. from 3 to 90% alternatively from 3 to 80% alternatively from 5 to 90% alternatively from 5 to 80%, alternatively from 10 to 90% alternatively from 10 to 80% by weight of the solid lubricant. Examples include compositions containing 50% or 60% solid lubricant on a dry weight composition. Most preferably the antifriction coating on the fabric comprises at least 20 or 30% up to 75 or 85% by weight solid lubricant on a dry weight basis e.g. from 20% to 85% alternatively from 20% to 75%, alternatively from 30% to 85% alternatively from 30% to 75% by weight solid lubricant on a dry weight basis. The organic polymer binder can for example comprise 3 to 70% or alternatively 3 to 50% of the coating on a dry weight basis. The total % amount of the composition for any of the above combinations is 100%

The amount of solid mineral lubricant such as talc is preferably not so high as to cause substantial settling of the talc during storage. The amount of talc present in a coating also containing PTFE solid lubricant is preferably in the range from 5 or 10% up to 30 or 40% for example 5% to 30%, alternatively 5% to 40%, alternatively 10% to 30% or alternatively 10% to 40%. When only solid mineral lubricant e.g. talc, is present in the composition, said solid mineral lubricant e.g. talc is present in the range of from 5 or 10% up to 80 or 90% for example 5% to 90%, alternatively 5% to 80%, alternatively 10% to 90%, alternatively 10% to 80%, by weight of the coating on a dry weight basis. The use of talc in an antifriction coating according to the present invention avoids problems associated with dust control when talc is applied as a powder to air bags to inhibit blocking.

The antifriction coating composition may contain a wetting agent to ensure that the coating will spread on the cured organopolysiloxane base coat. One type of preferred wetting agent is a siloxane polyether, particularly a polyoxyethylene-siloxane in which the polyether group is hydroxyl-terminated, otherwise known as a silicone glycol. Such wetting agents include siloxane compounds which contain an alkylpoly(ethylenexoy) siloxane group associated with an alkyl siloxane group, where the alkyl group contains 1-6 carbon atoms. They are preferably compounds of low molecular weight, preferably containing between 2 and 8 silicon atoms. For example, the wetting agents may contain 1-3 alkylpoly(ethyleneoxy)siloxane groups (i) and 1 to 4 alkyl-siloxane groups (ii). Alternatively the wetting agents may be a trisiloxane containing one alkylypoly(ethyleneoxy)siloxane group (i) and two methyl- and/or ethyl-siloxane groups (ii). Preferably, the average number of ethyleneoxy (EO) units in the alkylpoly(ethyleneoxy) siloxane group (ii) is between 5 and 12 inclusive. Preferably, the end unit of the alkylpoly(ethyleneoxy) siloxane group (ii) is an acetoxy, hydroxyl or alkoxy unit (e.g. methoxy). For example compounds of the following structure:

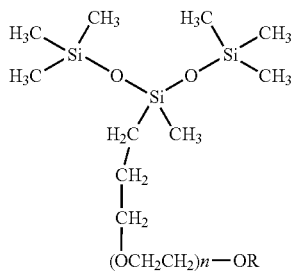

Where:
n=3-20
R=H, CH$_3$, CH$_3$CH$_2$, CH$_3$CO

Other R groups can be used and the length of the alkyl chain between the Si Atom and the EO chain may vary from 1 to 12 carbons, for example 3 carbon atoms thereby forming a propyl link between the Si atom and the EO chain. Preferred examples include but are not limited to 1,1,1,3,5,5,5-heptamethyl-3-polyethoxypropyl-trisiloxane and. The wetting agent is preferably present in the coating composition at up to 10% by weight in the formulation, for example from 0.5% or 1% up to 3%.

The antifriction coating composition may contain an adhesion promoter to improve adhesion of the coating to the cured organopolysiloxane base coat. One type of preferred adhesion promoter is an epoxysilane, for example an epoxyalkyltrialkoxysilane such as 3-glycidoxypropyltrimethoxysilane, (alk)acryl oxyalkyltrialkoxy silanes such as methacryloxypropyltrimethoxysilane or aminosilanes such as those referred to above. Organosilicon compounds having epoxy and alkoxy functionalities, for example as described in U.S. Pat. No. 3,455,877 (incorporated by reference) may also be used. The alkoxy radicals may be the same or different and are usually selected from alkoxy radicals having from 1 to 4 carbon atoms, for example, methoxy or ethoxy. Any other substituents, when present, are preferably selected from alkyl groups having from 1 to 8 carbon atoms. Suitable silanes include e.g. ϑ-(3,4 epoxycyclohexyl)-ethyltrimethoxysilane The adhesion promoter is preferably present in the coating composition at up to 5% by weight in the formulation, for example from 0.2% or 0.5% up to 1%, i.e. 0.2% to 1% or alternatively from 0.5% to 1% by weight in the formulation. In the case of aminosiloxanes, if being used solely as an adhesion promoter said aminosiloxane will not be present in an amount greater than 5% by weight in the composition.

The antifriction coating composition may contain a flame retardant. It is important that air bags do not support burning, and the air bag generally requires addition of a flame retardant in order to pass the stringent flammability tests applicable to air bags. The flame retardant may be most effective if it is in the top coat. An example of a preferred flame retardant is aluminum trihydrate, which preferably has not been surface treated. The antifriction coating composition can for example contain 5 to 40% by weight aluminum trihydrate. The coating on the fabric can for example contain 5 to 55% aluminum trihydrate on a dry weight basis.

If the antifriction coating composition contains a mineral lubricant such as talc, it may contain a thickener to inhibit settling of the talc. The thickener can for example be fumed silica, bentonite clay, or a polymeric thickener such as polyvinyl alcohol. The thickener is preferably present in the coating composition at up to 5% by weight on a dry weight basis, for example from 0.2% or 0.5% up to 1%.

The antifriction coating can be applied to the coated air bag or coated air bag fabric by roller application, for example gravure, offset roller or lick roller, or by curtain coating, or by spray, which may be air assisted or airless spraying, or by knife is over roller. Roller application is often preferred as an effective method to coat uniformly at low coating weights. The amount of coating composition transferred to the fabric is a function of pressure on the roller and/or etched surface depth in the gravure. The antifriction coating is preferably applied at a coating weight of 1 g/m$^2$ up to 15 g/m$^2$ on a dry coat weight basis, for example at 3 to 5 g/m$^2$. Coating weights as low as 1 or 2 g/m$^2$ can give the required low coefficient of friction and prevent blocking. Higher coating weights, for example 5 to 15 g/m$^2$, can give the additional benefit of sealing the air bag to slow down loss of air pressure from the bag.

The amount of aqueous diluent (water plus any co-solvent mixed with the water) in the antifriction coating composition can be controlled in accordance with the required viscosity for coating and the required coating weight. Usually the coating composition has a solids content of 20 to 75% by weight and comprises 80 to 25% aqueous diluent.

The organopolysiloxane composition which is applied to the air bag or air bag fabric as a base coat can be any of those described in the aforementioned patents. The organopolysiloxane composition base coat preferably comprises an organopolysiloxane having aliphatically unsaturated hydrocarbon or hydrocarbonoxy substituents, an organosilicon crosslinker having at least 3 silicon-bonded hydrogen atoms, a catalyst able to promote the reaction of the aliphatically unsaturated hydrocarbon or hydrocarbonoxy substituents with Si—H groups and a reinforcing filler.

The organopolysiloxane base coat is usually cured before application of the antifriction coating, but in an alternative process the antifriction coating composition is applied to uncured organopolysiloxane base coat and the combination of the organopolysiloxane base coat composition and the antifriction coating composition is heat cured.

When the antifriction coating is applied to a cured organopolysiloxane base coat, the antifriction coating can be cured at ambient temperature or can be cured more rapidly at elevated temperature, for example in the range 50 to 200° C., particularly 100 to 150° C. One possible method of curing at elevated temperature comprises applying the antifriction coating composition to a heated substrate, for example to a coated air bag or air bag fabric immediately after heat curing the organopolysiloxane base coat.

When the antifriction coating composition is applied to an uncured organopolysiloxane base coat, application is preferably by spraying. U.S. Pat. No. 6,534,126 describes spraying an aqueous suspension of powdered silicone rubber onto uncured surfaces of thermosetting liquid silicone rubber compositions, and similar techniques can be used to apply the antifriction coating composition of this invention. The preferred organopolysiloxane composition base coat comprising an organopolysiloxane having aliphatically unsaturated hydrocarbon or hydrocarbonoxy substituents, an organosilicon crosslinker having at least 3 silicon-bonded hydrogen atoms and a catalyst, and an antifriction coating composition according to the invention which has been applied to the uncured surface of such a base coat, can be cured together on the fabric surface at a temperature in the range 100 to 200° C., for example at 125 to 150° C.

The antifriction coatings of the invention reduce friction at the coated air bag surface and thus reduce wear of the air bag when it is subjected to movement when a vehicle is in use; such wear may result in reduced pressure retention of the air bag. The antifriction coatings also inhibit blocking of the silicone surfaces, that is sticking of the coated surfaces to each other during storage or tight packing in the air bag compartment of a vehicle. Such blocking can cause very high stresses when the airbag is inflated, resulting in bag failure by tearing or by delamination of the silicone base coat from the fabric. We have also found that antifriction coatings according to the invention have some effect in increasing the sealing of the air bag against loss of air pressure, particularly when the coating weight of antifriction coating is above 5 g/m$^2$. It is unusual for a top coat to improve the pressure retention of an air bag.

Preferably the airbags described herein are particularly useful in airbag applications, in which pressurised gas has to be retained in a fabric envelope for a relatively long period e.g. >5 seconds or above, particularly in side curtain airbags for the automotive industry. These side curtain airbags are intended to inflate at the time of impact, as do conventional airbags. The side curtains unfold to form a cushioned curtain between passengers and some of the side of the car body, e.g., the windows. As the intention is not merely to cushion the blow on impact itself, as is the case for conventional driver and passenger airbags, but to protect passengers e.g. when a car is rolling, it is important that the side curtain air bag is sufficiently pressurised during such rolling process. Where conventional driver and passenger airbags only need to retain pressure for a fraction of a second, it is desirable that side curtain airbags maintain a suitable pressure for a few seconds. Similar applications exist where a pressurised fabric structure is desired to maintain a certain gas pressure for a relatively extended period of time, e.g. in emergency chutes for aeroplanes, or inflatable rafts. There is thus a demand for coated fabrics having the benefits of flexibility and high temperature resistance at low coating weight given by silicone rubber coatings, but with improved air tightness.

The invention is illustrated by the following Examples, in which parts and percentages are by weight unless otherwise stated

EXAMPLE 1

1,1,1,3,5,5,5-heptamethyl-3-polyethoxypropyl-trisiloxane wetting agent and 3-glycidoxypropyltrimethoxysilane adhesion promoter were added to an aqueous aliphatic polyurethane dispersion stabilized by non-ionic surfactant, and mixed with an aqueous dispersion of PTFE powder stabilized by non-ionic surfactant to form an antifriction coating composition comprising 52% water, 38% PTFE, 3.0% urethane polymer, 3.0% wetting agent, 1.0% epoxysilane adhesion promoter and 3.0% (t-Octylphenoxy)polyethoxyethanol non-ionic surfactant.

The above antifriction coating was applied by gravure roller coating to the coated surface of a woven nylon air bag fabric coated with 55 g/m$^2$ of a cured liquid silicone rubber. The base coating comprised an organopolysiloxane having aliphatically unsaturated hydrocarbon or hydrocarbonoxy substituents, an organosilicon crosslinker having at least 3 silicon-bonded hydrogen atoms, a platinum complex catalyst and a silica reinforcing filler. The antifriction coating was heat cured at 140° C. In different experiments, the antifriction coating was applied at coat weights of 3 g/m$^2$ and 6 g/m$^2$.

The coefficient of friction (COF) of the overcoated surfaces was measured according to ASTM D-1894 by the TMI Monitor/Slip and Friction Tester from Testing Machine Inc. of Ronkonkoma, N.Y., using a 200 g sled. The COF of the fabric coated with 3 g/m$^2$ antifriction coating was 0.9 and the COF of the fabric coated with 6 g/m$^2$ antifriction coating was 0.8. By comparison, the COF of fabric coated with a cured liquid silicone rubber base coat is in the range 1.2 to 1.9.

The fabric coated with 6 g/m$^2$ antifriction coating was made up into a curtain air bag. The air bag was tested in a dynamic pressure retention test in which a 10 liter tank is pressurized to 140 kPa and is evacuated within 0.2 seconds into the bag. The pressure in the bag is tracked over a period of 10 seconds after pressure release. The time taken to reach 50 kPa was 6 seconds. By comparison, when an air bag made from the fabric coated with the cured liquid silicone rubber base coat only was tested, the time taken to reach 50 kPa was 3 seconds.

EXAMPLE 2

Example 1 was repeated except that talc of average particle size 4 μm sold under the trade name Imifabi HTP3 was mixed into the dispersion of PTFE and polyurethane binder. The formulation of the antifriction coating was 50% water, 32% PTFE, 8.3% talc, 2.7% polyurethane, 3.0% wetting agent, 1.0% adhesion promoter and 3.0% non-ionic surfactant.

The COF of the fabric coated with 3 g/m$^2$ antifriction coating of Example 2 was 0.5 and the COF of the fabric coated with 6 g/m$^2$ antifriction coating was 0.3. It can be seen that the use of talc in conjunction with PTFE in the antifriction coating further reduced the COF of the coated air bag surfaces.

EXAMPLE 3

Aliphatic polyurethane and a 2,5-furandione 1-butene copolymer were dispersed in water stabilized by anionic surfactant containing cosolvents. A PTFE dispersion was mixed with the resulting dispersion to form an antifriction coating comprising 45.0% water, 26.0% PTFE, 9.3% polyurethane, 8.3% furandione butene copolymer, 5.0% sodium dodecylbenzene sulfonate anionic surfactant, 3.0% isopropanol, 2.6% N-methylpyrrolidone and 0.87% dipropylene glycol monomethyl ether.

The antifriction coating of Example 3 was applied by gravure roller coating to the coated surface of air bag fabric coated with a cured liquid silicone rubber coating and heat cured as described in Example 1. Reduced friction properties were achieved with greater process stability in the gravure coating process.

EXAMPLE 4

An antifriction coating was prepared by the procedure of Example 2 with addition of aluminum trihydrate with the talc. The resulting coating composition comprised 52 parts water, 38 parts PTFE, 10 parts talc, 20 parts aluminum trihydrate, 3.0 parts urethane polymer, 2.0 parts wetting agent, 1.0 part epoxysilane adhesion promoter and 3.0 parts (t-Octylphenoxy)polyethoxyethanol non-ionic surfactant.

The antifriction coating was applied by gravure roller coating at 8 g/m² to the coated surface of a 1.7 m³ woven nylon air bag fabric coated with 52 g/m² of a cured liquid silicone rubber. The base coating comprised an organopolysiloxane having aliphatically unsaturated hydrocarbon or hydrocarbonoxy substituents, an organosilicon crosslinker having at least 3 silicon-bonded hydrogen atoms, a platinum complex catalyst and a silica reinforcing filler. The antifriction coating was heat cured at 140° C. The COF of the fabric coated with 6 g/m² antifriction coating was 0.3.

The air bag thus coated was subjected to a pressure retention test in which the air bag was pressurized to 80 kPa. The air valves were closed and the pressure inside the air bag was electronically monitored over 10 seconds. After 10 seconds, the pressure was 58 kPa.

In a comparative experiment, the air bag was coated with 60 g/m² of the silicone base coating. After 10 seconds in the pressure retention test the pressure was 48 kPa. The top coat thus improved the pressure retention of the air bag coated with silicone rubber alone, even at the same total coating weight on the air bag.

The invention claimed is:

1. An air bag coated with a cured organopolysiloxane composition, wherein the cured organopolysiloxane composition is directly top coated with an antifriction coating comprising a siloxane polyether wetting agent, an epoxysilane adhesion promoter, non-ionic surfactant, aluminum trihydrate, and solid lubricant comprising talc and polytetrafluoroethylene, wherein the solid lubricant is dispersed in an urethane polymer binder, wherein the antifriction coating comprises 5 to 30% of the talc on a dry coat weight basis; 20 to 90% of the solid lubricant, including the talc, on a dry coat weight basis; 3 to 50% of the urethane polymer binder on a dry coat weight basis; and 5 to 55% of the aluminum trihydrate on a dry coat weight basis.

2. An air bag according to claim 1, wherein the coating weight of the antifriction coating is 1 to 15 g/m² on a dry coat weight basis.

3. A process for coating an air bag or air bag fabric in which the bag or fabric is coated with an organopolysiloxane composition to form an organopolysiloxane base coat, wherein the organopolysiloxane base coat is directly top coated with an antifriction coating composition comprising an aqueous dispersion of a siloxane polyether wetting agent, an epoxysilane adhesion promoter, non-ionic surfactant, aluminum trihydrate, and solid lubricant comprising talc and polytetrafluoroethylene, wherein the solid lubricant is dispersed in an urethane polymer binder, wherein the antifriction coating comprises 5 to 30% of the talc on a dry coat weight basis; 20 to 90% of the solid lubricant, including the talc, on a dry coat weight basis; 3 to 50% of the urethane polymer binder on a dry coat weight basis; and 5 to 55% of the aluminum trihydrate on a dry coat weight basis.

4. A process according to claim 3, wherein the siloxane polyether wetting agent has 1-3 alkylpoly(ethyleneoxy)siloxane groups (i) and 1 to 4 alkyl-siloxane groups (ii).

5. A process according to claim 3, wherein the aqueous dispersion contains an aminosilane adhesion promoter.

6. A process according to claim 3, wherein the organopolysiloxane composition which is applied to the bag or fabric as base coat comprises an organopolysiloxane having aliphatically unsaturated hydrocarbon or hydrocarbonoxy substituents, an organosilicon crosslinker having at least 3 silicon-bonded hydrogen atoms, a catalyst able to promote the reaction of the aliphatically unsaturated hydrocarbon or hydrocarbonoxy substituents with Si—H groups and a reinforcing filler, and is cured before application of the antifriction coating.

7. A process according to claim 3, wherein the organopolysiloxane base coat is cured before application of the antifriction coating composition.

8. A process according to claim 3, wherein the antifriction coating composition is applied to uncured organopolysiloxane base coat and the combination of the organopolysiloxane base coat composition and the antifriction coating composition is heat cured.

9. An antifriction coating composition comprising a siloxane polyether wetting agent, an epoxysilane adhesion promoter, non-ionic surfactant, aluminum trihydrate, and solid lubricant comprising talc and polytetrafluoroethylene, wherein the solid lubricant is dispersed in an urethane polymer binder, wherein the antifriction coating comprises 5 to 30% of the talc on a dry coat weight basis; 20 to 90% of the solid lubricant, including the talc, on a dry coat weight basis; 3 to 50% of the urethane polymer binder on a dry coat weight basis; and 5 to 55% of the aluminum trihydrate on a dry coat weight basis.

10. An antifriction coating according to claim 9, wherein the siloxane polyether is a 1,1,1,3,5,5,5-heptamethyl-3-polyethoxypropyl-trisiloxane.

* * * * *